United States Patent
Gutierrez

(10) Patent No.: US 11,712,942 B2
(45) Date of Patent: Aug. 1, 2023

(54) HERMETICALLY SEALED CAP FOR HEAT EXCHANGER MODULATOR

(71) Applicant: DENSO International America, Inc., Southfield, MI (US)

(72) Inventor: Luis David Gutierrez, Guanajuato (MX)

(73) Assignee: Denso International America, Inc., Southfield, MI (US)

( * ) Notice: Subject to any disclaimer, the term of this patent is extended or adjusted under 35 U.S.C. 154(b) by 162 days.

(21) Appl. No.: 17/216,811

(22) Filed: Mar. 30, 2021

(65) Prior Publication Data
US 2022/0041033 A1 Feb. 10, 2022

Related U.S. Application Data

(60) Provisional application No. 63/061,402, filed on Aug. 5, 2020.

(51) Int. Cl.
*F25B 39/04* (2006.01)
*B60H 1/00* (2006.01)

(52) U.S. Cl.
CPC .............................. *B60H 1/00328* (2013.01)

(58) Field of Classification Search
CPC ...... F25B 2339/0041; F25B 2339/0442; F25B 2400/162; F25B 39/04; B01D 53/0407; B01D 53/0415; F28F 2220/00; F28F 2275/085; F16L 55/1125; F16L 55/1155; F16L 55/1157
See application file for complete search history.

(56) References Cited

U.S. PATENT DOCUMENTS

| | | | |
|---|---|---|---|
| 6,223,556 B1 * | 5/2001 | De Keuster | F28D 1/05366 62/509 |
| 7,776,118 B2 | 8/2010 | Min et al. | |
| 8,950,213 B2 * | 2/2015 | Mitsuhashi | F25B 39/04 165/110 |
| 2006/0123836 A1 * | 6/2006 | Kaspar | F25B 43/006 62/509 |

(Continued)

FOREIGN PATENT DOCUMENTS

| | | |
|---|---|---|
| EP | 1420219 A1 | 5/2004 |
| JP | 2009127883 A | 6/2009 |

(Continued)

*Primary Examiner* — Frantz F Jules
*Assistant Examiner* — Jason N Thompson
(74) *Attorney, Agent, or Firm* — Dickinson Wright PLLC

(57) ABSTRACT

A receiver drier assembly for an automotive heat exchanger is provided with a single-piece cap. In embodiments described herein, a modulator has a tubular wall and one or more openings are formed therein. The cap is a single-piece cap and is configured to attach directly to the tubular wall via a snap fit. The cap may have a protrusion that is configured to snap into engagement with the opening in the modulator when properly assembled. The protrusion may be tapered such that as the cap is assembled to the modulator, the protrusion is forced radially inwardly via the tapered surface sliding along the tubular wall. Once the protrusion meets the opening, the protrusion is allowed to flex radially outward toward its natural unbiased position, snap fitting with the opening of the tubular wall.

19 Claims, 6 Drawing Sheets

FIG. 2

(56) References Cited

U.S. PATENT DOCUMENTS

| | | | | |
|---|---|---|---|---|
| 2006/0123837 | A1* | 6/2006 | Shah | F25B 39/04 29/890.07 |
| 2008/0314075 | A1 | 12/2008 | Wolk et al. | |
| 2008/0314252 | A1* | 12/2008 | Min | F25B 39/04 96/151 |
| 2012/0103007 | A1* | 5/2012 | Mitsuhashi | F25B 39/04 62/474 |
| 2012/0111547 | A1* | 5/2012 | Suzuki | F28D 1/05391 165/173 |
| 2013/0152625 | A1* | 6/2013 | Lee | F25B 43/003 62/474 |
| 2016/0195209 | A1* | 7/2016 | Huelsman | F16L 55/1157 277/314 |
| 2019/0063802 | A1* | 2/2019 | Numasawa | F25B 39/04 |
| 2020/0317032 | A1* | 10/2020 | Cropp | B60H 3/024 |
| 2021/0172553 | A1* | 6/2021 | Kluss | F16L 43/001 |

FOREIGN PATENT DOCUMENTS

| | | |
|---|---|---|
| KR | 100761145 B1 | 11/2002 |
| KR | 200430632 Y1 | 11/2006 |
| KR | 200434755 Y1 | 12/2006 |
| KR | 101513930 B1 | 3/2010 |
| KR | 20100025185 A | 4/2015 |
| KR | 20200075367 A | 6/2020 |

\* cited by examiner

HERMETICALLY SEALED CAP FOR HEAT EXCHANGER MODULATOR

CROSS-REFERENCE TO RELATED APPLICATIONS

This application claims the benefit of U.S. provisional application Ser. No. 63/061,402 filed on Aug. 5, 2020, the disclosure of which is hereby incorporated in its entirety by reference herein.

TECHNICAL FIELD

The present disclosure relates to a cap for a modulator of a heat exchanger.

BACKGROUND

A cooling circuit used in, for example, a vehicle air-conditioning unit is configured to circulate a refrigerant in passages that extend through an evaporator, a condenser, or the like. Typically, a receiver drier is provided in which refrigerant circulates. The receiver drier is configured to temporarily store the refrigerant to separate vapor refrigerant from liquid refrigerant. A desiccant within a bag ("desiccant bag") may be located within the receiver drier for removing water from the refrigerant. A cap may attach to the receiver drier for containing the desiccant bag and refrigerant therein.

SUMMARY

In an embodiment, a receiver drier assembly for an automotive heat exchanger is provided. The receiver drier assembly includes a modulator configured to store and transfer heat-exchanger fluid therein, the modulator having a tubular wall having a plurality of openings formed therein. The receiver drier assembly also includes a cap configured to attach directly to the modulator and form a hermetic seal therewith, the cap extending along a central axis and having a plurality of protrusions extending radially outwardly therefrom. The protrusions are configured to attach to the modulator via the openings in a snap-fit engagement.

In another embodiment, a single-piece cap for a modulator of an automotive heat exchanger is provided. The single-piece cap includes an upper portion defining a pair of grooves extending annularly about and axis and configured to receive O-rings for hermetically sealing against an inner wall of a modulator, wherein the pair of grooves are separated by a recessed wall having an aperture formed therethrough that is aligned with an outlet of the modulator when the cap is assembled to the modulator. The single-piece cap also includes a lower portion having a frame and a pair of legs extending downward from the upper portion, the legs being flexible relative to the frame. The single-piece cap also includes a pair of tapered protrusions, each protrusion extending radially outward from a respective one of the legs, each protrusion having a tapered surface extending oblique to the axis and a transverse surface extending transverse to the axis when the cap is assembled to the modulator. The protrusions are configured to fit through corresponding openings in the modulator to attach the cap to the modulator.

In another embodiment, a receiver drier assembly for an automotive heat exchanger includes a modulator extending along an axis and configured to store and transfer heat-exchanger fluid therein, the modulator having a tubular wall defining an opening therethrough, the modulator further having a lower edge and a slot extending axially from the lower edge. The receiver drier assembly also includes a cap configured to attach directly to the modulator and form a hermetic seal therewith, the cap having a protrusion extending radially outwardly therefrom and a radial tab extending radially outwardly therefrom. The radial tab is sized and configured to be received in the slot to locate the cap with respect to the modulator during assembly. The protrusion is configured to flex radially inwardly as the cap is pressed axially into engagement with the modulator. The protrusion is received within the opening when the cap is assembled to the modulator.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Terms such as "leading," "front," "forward," "rearward," "top," "bottom," "upper," "lower," etc. may be used in this disclosure. These terms are for giving positional context of various components relative to a vehicle in which the heat exchanger resides. For example, the leading or front edge of a component is one that is forward-most in the direction of the front of the vehicle (e.g., the vehicle grille). Terms such as "radial," "circumferential," "axial," and the like are relative to an axis. Moreover, unless otherwise noted, directional terms are used in context to the Figures that they describe, relative to the orientation of the Figure and should not limit the structure to only the directional term. These are merely exemplary words used in context of the orientations shown in the Figures.

Figure 1:
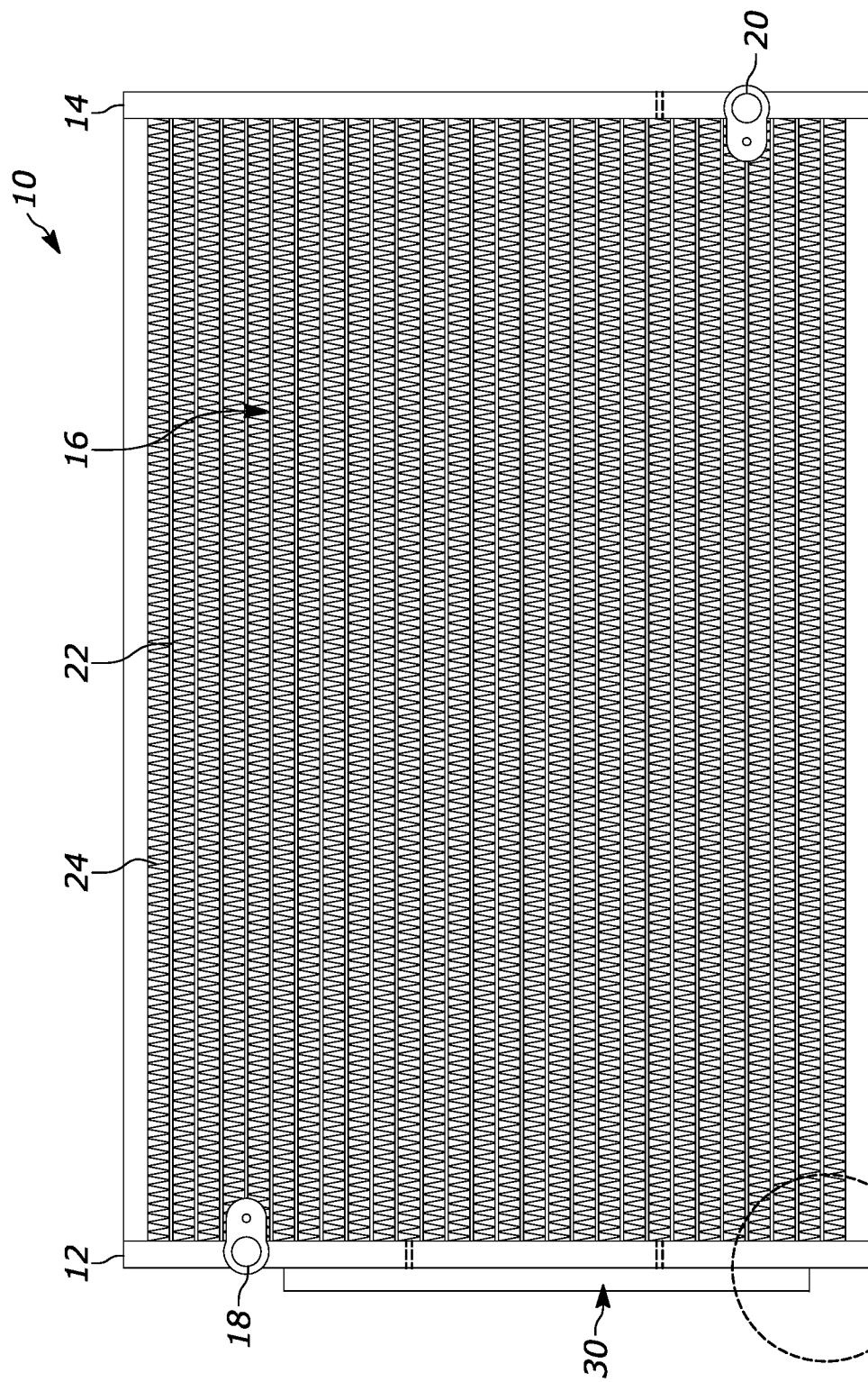
FIG. 1 illustrates a front view of an automotive heat exchanger, according to an embodiment.

FIG. 1 shows a front view of a heat exchanger 10 according to an embodiment. In embodiments described herein, the heat exchanger 10 is a condenser in an automotive heating, ventilation and air conditioning (HVAC) system, although a condenser is but one type of heat exchanger that the teachings of this disclosure can be applied to. For example, the heat exchanger 10 can also be a radiator, oil cooler, or other types of heat exchangers known to be located in front of an engine of an automobile (e.g., car, truck, van, sports utility vehicle, etc.). The heat exchanger 10 includes an inlet header tank 12, an outlet header tank 14, and a core 16 disposed between the inlet header tank 12 and the outlet header tank 14. The inlet header tank 12 defines an inlet 18 through which a fluid (e.g., coolant, refrigerant) enters the heat exchanger 10, and the outlet header tank 14 defines an outlet 20 through which the coolant exits the heat exchanger 10. While the inlet 18 and outlet 20 are shown to exist in opposite header tanks, in other embodiments the inlet is above the outlet in the same header tank. The core 16 includes a plurality of tubes 22 and a plurality of fins 24 which extend between the inlet header tank 12 and the outlet header tank 14. The tubes 22 fluidly connect the inlet 18 to the outlet 20. The tubes 22 and the fins 24 are arranged in parallel in an alternating pattern such that adjacent tubes 22 are connected in parallel via a fin 24.

Coolant (e.g., refrigerant), which may either be a liquid or gaseous phase, flows from the inlet header tank 12 through the core 16, and to the outlet header tank 14. The core 16 cools the coolant flowing through the heat exchanger 10. More specifically, the coolant flows through the tubes 22, and the fins 24 conduct or transfer heat from the coolant flowing through the tubes 22. Heat transferred to the fins 24 is transferred to air flowing through the radiator 10. The air flowing through the heat exchanger 10 can be supplied naturally when the vehicle is traveling, or via a fan (not shown).

The heat exchanger 10 may also include or be coupled with a receiver drier assembly 30 (also referred to as a modulator assembly). The receiver drier assembly 30 stores the coolant and removes moisture and dissimilar substances contained in the coolant. The receiver drier assembly 30 can be directly coupled to or within the inlet header tank 12. However, in other embodiments, the receiver drier assembly 30 may be directly coupled to or within the outlet header tank 14. As the coolant flows through one of the header tanks (in this embodiment, the inlet header tank 12), some of the coolant flows through the receiver drier assembly 30 where the coolant can be filtered and desiccated.

Figure 2:
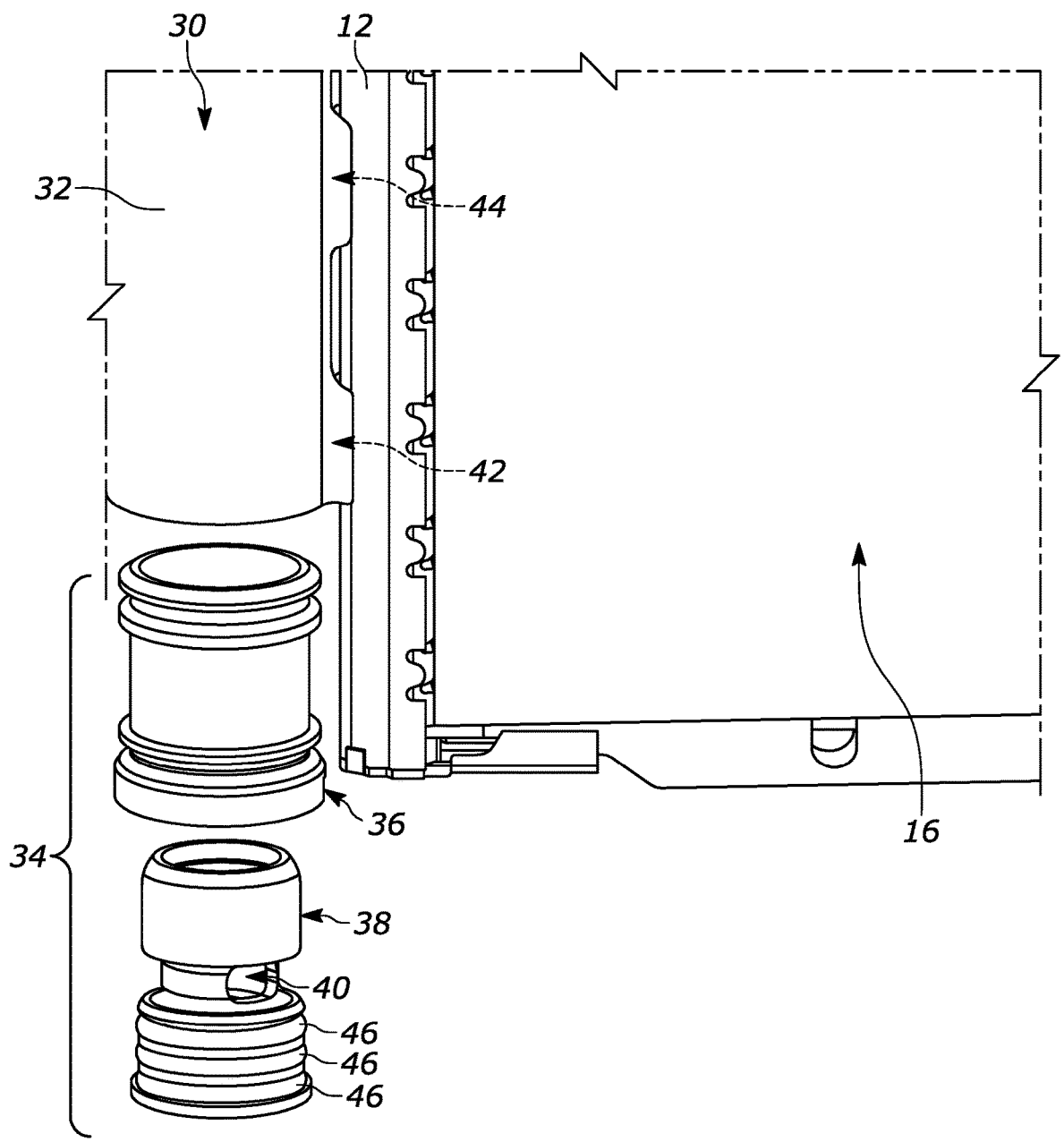
FIG. 2 illustrates a perspective view of a region of the heat exchanger of FIG. 1 with a cap shown exploded or disassembled, according to an embodiment.

FIG. 2 shows a region of the heat exchanger 10 in which a cap for the receiver driver assembly 30 is located. A modulator 32 defines an outer tube or channel for the receiver drier assembly 30. The modulator 32 is a tube structure that the coolant flows through within the receiver drier assembly 30. A cap assembly 34 (also referred to as a two-part cap) is assembled to the bottom of the modulator 32, and caps the modulator 32 and prevents the coolant from leaking out through the bottom of the modulator. The cap assembly 34 includes a female cap 36 and a male cap 38. The female cap 36 may also be referred to as a thread. An outer surface of the female cap 36 is attached to an inner surface of the modulator via brazing, welding, or the like.

Thereafter, the male cap 38 is inserted into the female cap 36 and is attached via by screwing into the female cap 36.

Both the female cap 36 and the male cap 38 may include an opening to allow the coolant to pass between the modulator 32 and the inlet header tank 12. For example, the male cap 38 may be provided with an opening 40 formed therein that is aligned with an outlet 42 of the receiver drier assembly 30. A corresponding opening in the female cap 36 may be aligned with the opening 40 but is not shown in this orientation. The openings allow coolant to exit the modulator 32. During operation, the coolant flows from the inlet header tank 12, into the receiver drier assembly 30 via an inlet 44, through the cap assembly 34, and out through the opening 40 and aligned outlet 42 of the receiver drier assembly back into the inlet header tank 12.

The cap assembly 34 shown in FIG. 2 utilizes a complex design, relying on several components for sealing of the modulator 32. For example, the female cap 36 requires several machining processes for its manufacture, resulting in a high price. The female cap 36 also requires multiple steps of assembly, requiring first the female cap 36 to be assembled to the modulator 32 and then the male cap 38 assembled to the female cap 36. Moreover, the male cap utilizes a plurality (e.g., three) O-rings 46 to seal against the inner wall of the female cap 36. The cap assembly 34 may also be difficult to disassemble, requiring large amounts of prying forces to disengage the screw fitting between the male cap 38 and the female cap 36. All of this exemplifies how the cap assembly 34 can be costly in money, time of manufacture, and repair.

Figure 3:
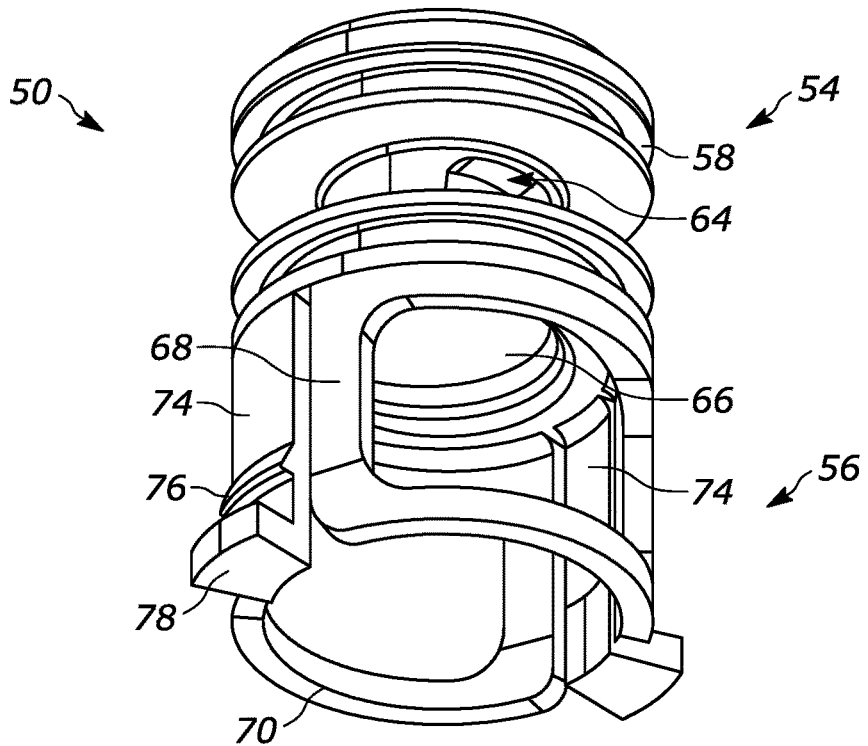
FIG. 3 illustrates a bottom perspective view of a cap for a modulator of a heat exchanger, according to an embodiment.
Figure 4:
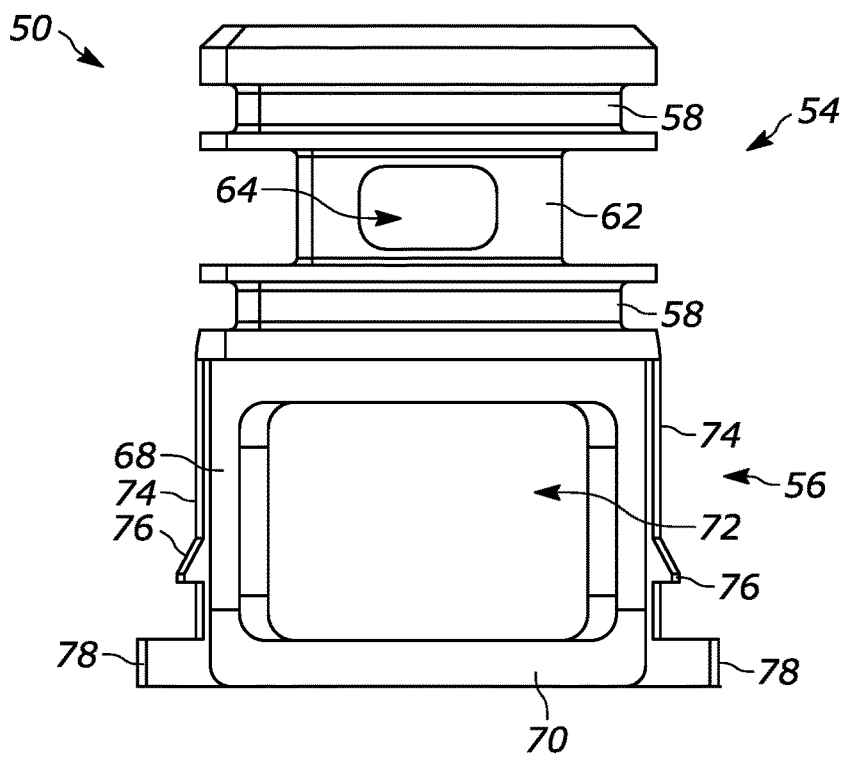
FIG. 4 illustrates a side view of the cap of FIG. 3.
Figure 5:
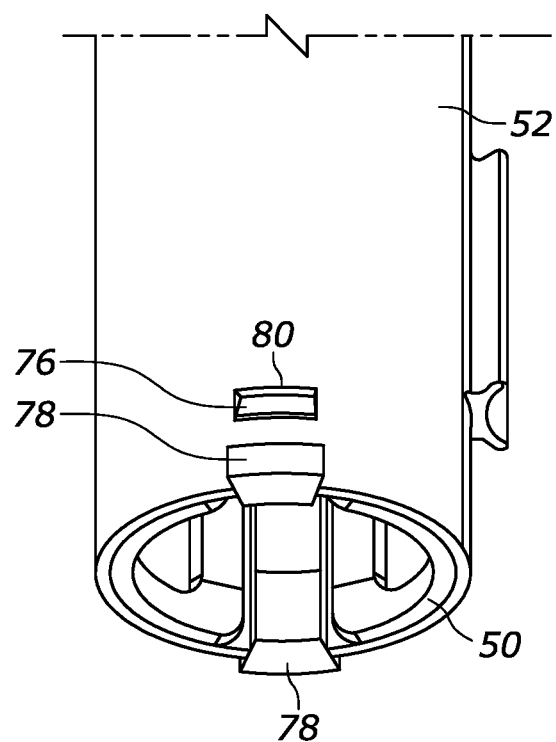
FIG. 5 illustrates a bottom perspective view of the cap of FIG. 3 assembled to a modulator, according to an embodiment.

Therefore, according to embodiments described herein, a single-piece modulator cap is disclosed. The modulator cap, or generally referred to as a cap 50, is shown in isolation in FIGS. 3-4, and assembled to a modulator 52 in FIGS. 5-6 as part of a receiver drier assembly. As will be described, the cap 50 can engage the modulator 52 in a snap-fit. The cap 50 is a single-piece cap in that there is no male cap and female cap that are needed to connect to one another inside of the modulator 52 (which is the case in the embodiment illustrated in FIG. 2); although O-rings may be used to seal against the modulator 52, the remainder of the cap 50 is a single piece.

Referring to FIGS. 3-6, the cap 50 may be a single, unitary device formed from injection molding, 3D printing, or the like. The cap 50 may be formed with an upper portion 54 and a lower portion 56 as one single unit. The upper portion 54 may have grooves 58 for receiving respective O-rings 60 for sealing against an inner wall of the modulator 52. This provides a hermetical seal between the cap 50 and the modulator 52. The upper portion 54 may have, between the grooves 58, a recessed wall 62 that does not contact the modulator 52. The recessed wall 62 may include an aperture 64 formed therein that is may be aligned with an outlet of the receiver drier assembly (e.g., such as outlet 42 of receiver drier assembly 30 of FIG. 2) to enable fluid to pass therethrough. The upper portion 54 may include a planar surface 66 or wall for structurally supporting the cap 50 as well as fluidly separating the upper portion 54 from the lower portion 56 (e.g., so that no fluid travels to the interior of the cap 50 below the planar surface 66. A filter (not shown) may be provided within the interior of the upper portion 54. The filter may itself be a meshed surface, or may itself be a screen or filter, or may support a meshed surface or screen or filter.

The lower portion 56 of the cap 50 may include a frame 68. The frame 68 may define a main body of the cap 50, and in some embodiments may define one or more of the grooves. The frame 68 may extend downward from the planar surface 66 or wall. The frame 68 extends in an axial direction (e.g., parallel to a central axis 69 of the cap 50 and modulator 52) away from the planar surface 66, and then turns and extends in a circumferential direction, forming a lower end 70. The frame 68 also provides a support or shield to avoid damage to the legs 74 (described below) during handling. The lower end 70 may extend circumferentially about a central axis 69 of the cap 50, and then connect to anther axially-extending portion of the frame 68. When assembled, the lower end 70 may be in-line with the lower edge of the modulator 32; alternatively, the lower end 70 may extend slightly below the lower end of the modulator 32. The frame 68 also defines a central opening 72 that is a void of material to reduce the surface-on-surface contact with the inner surface of the modulator 52. The central opening 72 is bound within the frame 68, and two openings 72 may be aligned in a direction transverse to the central axis 69 of the cap 50.

The cap 50 may also include one or more snap-fit features. In the illustrated embodiment, the cap 50 includes a pair of legs 74 extending in an axial direction away from the planar surface 66 and toward a lower edge of the modulator 52 when assembled. It can also be said that the legs 74 extend axially from the frame 68. Each leg 74 includes a tapered protrusion 76, and a ledge or shoulder 78 for engagement with the modulator 52. The tapered protrusions 76 are tapered outwardly relative to a direction away from the planar surface 66. In other words, the protrusions 76 extend further outwardly as one goes down toward the lower end 70 of the cap 50. The legs 74 are relatively flexible, being a single linear extending of an upper portion of the frame 68 and unsupported and separated from the lower end 70 of the cap 50. The legs 74 may be located on opposite sides of the cap 50 (e.g., 180 degrees about the axis 69).

The legs 74, protrusions 76 and shoulders 78 enable the snap fit during assembly. In particular, a user can press the cap 50 into the modulator 52. As the cap 50 slides upward along the inner surface of the modulator 52, the legs 74 are biased or bent inwardly due to the protrusion 76 contacting the inner surface of the modulator 52. The modulator 52 is provided with openings 80 in its wall that are sized and configured to receive the protrusions 76. The openings 80 may be machined or otherwise formed as a removal of material in the wall of the modulator 52. The lower end of the modulator 52 may also similarly be formed to include grooves, pockets, or the like that receive the shoulders 78 such that the shoulders 78 are flush with the lower end of the modulator 52. As the cap 50 is slid along the inner surface of the modulator 52, the protrusions snap and fit into the openings 80. Tapered surfaces 82 of the protrusions 76 enable the legs 74 to bend inwardly during insertion into the modulator 52, and transverse surfaces 84 (i.e. extending transverse to the central axis 69 of the cap 50) engage the surfaces of the modulator 52 that form the opening 80, thus locking the cap 50 into place. The tapered surfaces 82 may extend oblique to the axis 69, while the transverse surfaces 84 may extend transverse to the axis 69. The transverse surface 84 inhibit the cap 50 from sliding out of the modulator 52 by engaging the surfaces of the modulator 52 that form the openings 80, while the shoulders 78 inhibit the cap 50 from sliding further into the modulator 52 by engaging the lower edge of the modulator 52. The protrusions 76 also inhibit rotational movement (e.g., circumferentially about the axis 69) of the cap 50 relative to the modulator 52 when assembled thereto. The shoulders 78 being disposed within corresponding holes or pockets of the modulator 52 also inhibit rotational movement of the cap 50 relative to the modulator 52.

Figure 6:
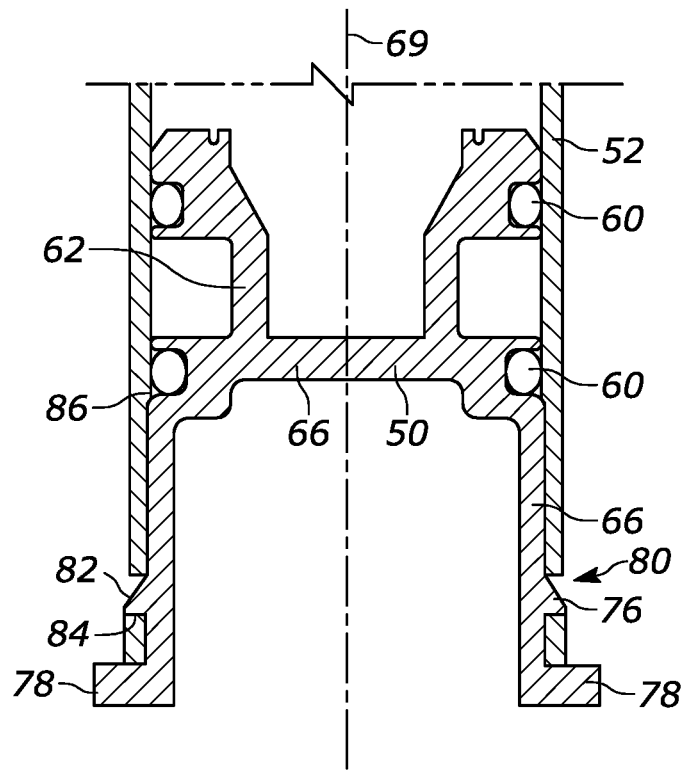
FIG. 6 illustrates a cross-sectional view of the cap assembled to the modulator as shown in FIG. 5, according to an embodiment.

The modulator 52 may also be formed to have an increased thickness at a region thereof. For example, referring to FIG. 6, a thickened wall 86 or protrusion may extend further inward relative to a remainder of the inner wall of the modulator 52. The thickened wall 86 may be only at a portion of the modulator 52 that contacts the O-rings 60 when the cap 50 is assembled. The increased thickness at the thickened wall 86 allows the O-rings 60 to have a proper hermetic seal. The increased thickness at the thickened wall 86 also facilitates assembly; a consistent diameter throughout the modulator 52 may cause O-rings 60 to pinch or twist as the cap 50 is pressed into the modulator 52. As shown in FIG. 6, the thickened wall 86 may be provided with a tapered ledge that transitions from the greater inner diameter to the reduced inner diameter to facilitate the O-rings 60 sliding onto the thickened wall 86. In another embodiment, the bottom portion of the modulator located lower than the O-rings 60 may be expanded (e.g., tube expansion).

To remove the cap 50 from the modulator 52, a technician can squeeze the shoulders 78 radially inward toward the axis 69. This disengages the shoulders 78 from the lower edge of the modulator 52, and also forces the protrusions 76 radially inward to disengage from the openings 80 in the modulator 52. With the shoulders 78 held in the radially-inward position, the cap 50 can be slid outward (e.g., downward) from the modulator 52. This removes the need for other tools (e.g., screwdriver or allen wrench) that would otherwise be required to remove a cap from the modulator, such as the embodiment illustrated in FIG. 2.

Figure 7:
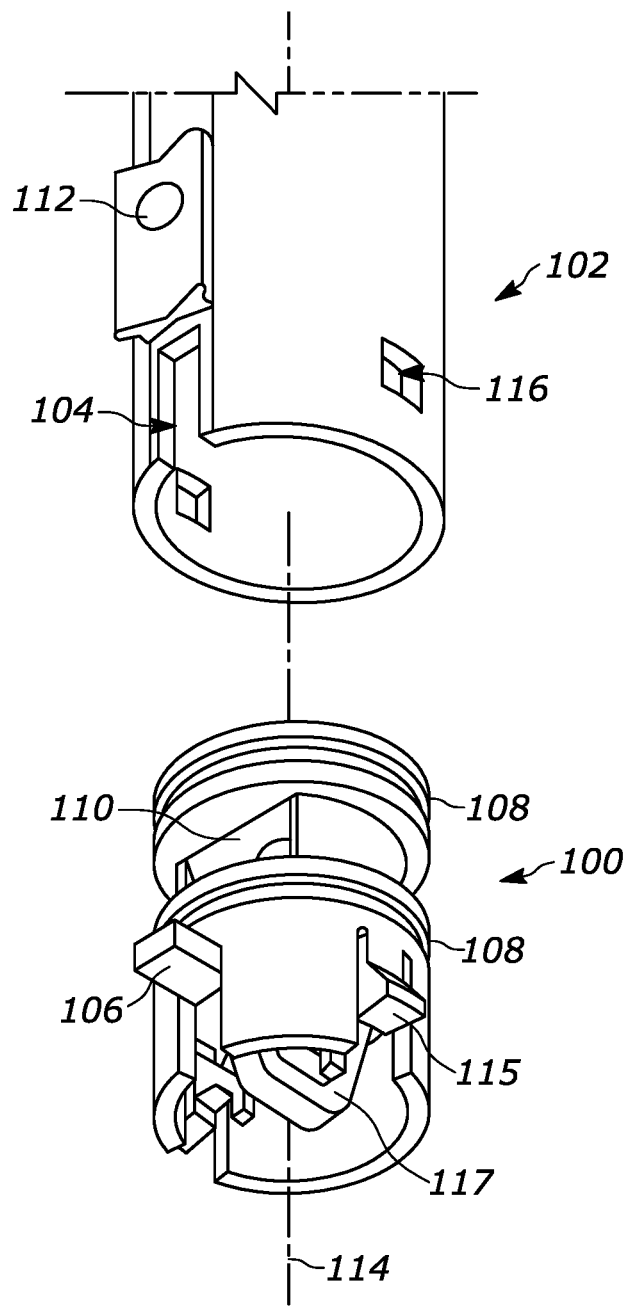
FIG. 7 illustrates an exploded perspective view of a cap and modulator according to another embodiment.
Figure 8:
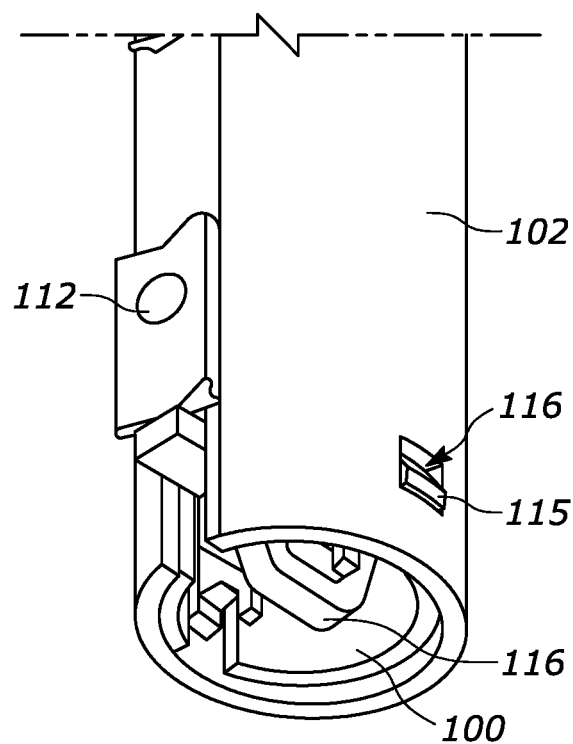
FIG. 8 illustrates an assembled perspective view of the cap and modulator of FIG. 7.
Figure 9:
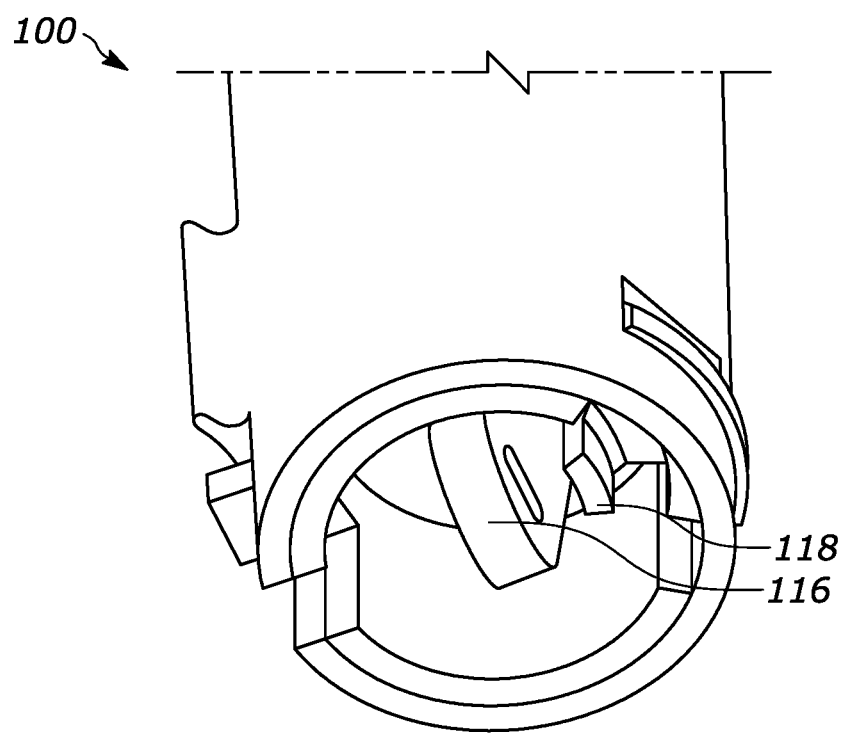
FIG. 9 illustrates another assembled perspective view of the cap and modulator of FIG. 7.

FIGS. 7-9 illustrate a cap 100 according to another embodiment. Unless otherwise described herein, the cap 100 may include similar structure as that described in the embodiment illustrated in FIGS. 3-6, and thus the earlier description applies fully to this embodiment unless otherwise noted. As in the previous embodiment, the cap 100 is a single, unitary piece as opposed to requiring a male cap and female cap for insertion into the modulator.

The modulator 102 includes a slot or guide 104 formed therein extending axially upward along the modulator for receiving a tab 106 of the cap 100. When the cap 100 is inserted into the modulator 102, the tab 106 can be slid into the guide 104. The engagement of the tab 106 and the guide 104 helps maintain rotational alignment of the cap 100 and modulator 102 during assembly (and during use of the product) to assure proper alignment of the filter and outlet which will be described further below.

Once again, the cap 100 is provided with a pair of grooves 108 configured to receive a corresponding pair of O-rings (not shown) for sealing against the inner surface of the modulator 102. This provides a hermetic seal between the cap 100 and the modulator 102. Between the grooves 108 is a receiver filter 110. The filter 110 may be referred to as a transverse filter, as it is oriented transverse to the direction of flow of fluid out through an outlet 112 of the modulator 102. The filter 110 is oriented parallel to and offset from the central axis 114. In other words, the filter 110 does not intersect the central axis 114. The filter 110 can be located in-line with the outlet 112 such that it filters any and all liquid that is to exit the outlet 112 of the modulator 102. The filter 110 can be welded or otherwise connected to the main body of the cap 100.

Similar to previous embodiments, the cap 100 includes one or more protrusions 115 extending radially outward therefrom. The protrusions 115 can be similar to protrusions 76 described above. The protrusions 115 may be tapered as described above to facilitate assembly into the modulator 102. Likewise, the modulator 102 may include slots or openings 116 sized and configured to receive the tapered protrusions 115 in a snap-fit engagement.

The cap 100 may also include a pair of projections or tabs (e.g., wall 117 and hook or tab 118) extending axially downwardly. Since the cap 100 is of a unitary design, the tab 118 and the protrusion 115 are attached to the cap 100 via a living hinge. The wall 117 and tab 118 are flexible relative to one another to facilitate removal of the cap 100 from the modulator 102. A user may use a tool (e.g., pliers) to pinch the wall 117 and hook tab together, which pulls the protrusion 115 radially inward, releasing it from the opening 116 and disengaging the cap 100 from the modulator 102.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A receiver drier assembly for an automotive heat exchanger, the receiver drier assembly comprising:
   a modulator configured to store and transfer heat-exchanger fluid therein, the modulator having a tubular wall having a plurality of openings formed therein; and
   a cap configured to attach directly to the modulator and form a hermetic seal therewith, the cap extending along a central axis and having a plurality of protrusions extending radially outwardly therefrom, wherein the protrusions are configured to attach to the modulator via the openings in a snap-fit engagement;
   wherein the cap includes a frame and a pair of legs extending axially from the frame, and wherein each protrusion extends radially from a respective one of the legs.

2. The receiver drier assembly of claim 1, wherein the legs are more flexible than the frame.

3. The receiver drier assembly of claim 1, wherein each protrusion includes a tapered surface tapering in an outward direction such that insertion of the cap into the modulator slides the tapered surfaces along the modulator and flexes the legs radially inwardly.

4. The receiver drier assembly of claim 3, wherein each tapered surface terminates at a transverse surface that extends transverse to the central axis, wherein each transverse surface contacts a surface that defines a respective one of the openings in the modulator when assembled to the modulator.

5. The receiver drier assembly of claim 1, wherein each leg terminates at a shoulder configured to engage an end of the modulator when attached to the modulator.

6. The receiver drier assembly of claim 1, wherein the cap is a single-piece cap.

7. A single-piece cap for a modulator of an automotive heat exchanger, the cap comprising:
   an upper portion defining a pair of grooves extending annularly about and axis and configured to receive O-rings for hermetically sealing against an inner wall of a modulator, wherein the pair of grooves are separated by a recessed wall having an aperture formed therethrough that is aligned with an outlet of the modulator when the cap is assembled to the modulator;
   a lower portion having a frame and a pair of legs extending downward from the upper portion, the legs being flexible relative to the frame; and
   a pair of tapered protrusions, each protrusion extending radially outward from a respective one of the legs, each protrusion having a tapered surface extending oblique to the axis and a transverse surface extending transverse to the axis when the cap is assembled to the modulator, wherein the pair of tapered protrusions are configured to fit through corresponding openings in the modulator to attach the cap to the modulator.

8. The single-piece cap of claim 7, wherein engagement between the tapered protrusions and the corresponding openings in the modulator inhibit rotational movement of the cap relative to the modulator.

9. The single-piece cap of claim 8, wherein each leg includes a shoulder extending radially outwardly therefrom at a lower edge of the lower portion.

10. The single-piece cap of claim 9, wherein engagement between the legs and a lower edge of the modulator inhibit axial movement of the cap relative to the modulator.

11. The single-piece cap of claim 7, wherein the frame defines a central opening extending entirely through the lower portion.

12. The single-piece cap of claim 7, wherein radially-inward movement of the legs disengages the cap from the modulator.

13. A receiver drier assembly for an automotive heat exchanger, the receiver drier assembly comprising:
   a modulator extending along an axis and configured to store and transfer heat-exchanger fluid therein, the modulator having a tubular wall defining an opening therethrough, the modulator further having a lower edge and a slot extending axially from the lower edge; and
   a cap configured to attach directly to the modulator and form a hermetic seal therewith, the cap having a protrusion extending radially outwardly therefrom and a radial tab extending radially outwardly therefrom, wherein the radial tab is circumferentially spaced from the protrusion;
   wherein the radial tab is sized and configured to be received in the slot to locate the cap with respect to the modulator during assembly, and wherein the protrusion is configured to flex radially inwardly as the cap is pressed axially into engagement with the modulator, and wherein the protrusion is received within the opening when the cap is assembled to the modulator.

14. The receiver drier assembly of claim 13, wherein the protrusion includes a tapered surface extending oblique to the axis and a transverse surface extending transverse to the axis when the cap is assembled to the modulator.

15. The receiver drier assembly of claim 13, wherein the cap includes an axial tab extending axially downward therefrom, wherein the axial tab is connected to the protrusion such that bending the axial tab causes the protrusion to disengage from the opening of the modulator.

16. The receiver drier assembly of claim 15, wherein the cap includes a wall extending axially downward therefrom and spaced apart from the axial tab, wherein pinching the wall and axial tab together causes the protrusion to disengage from the opening of the modulator.

17. The receiver drier assembly of claim 13, wherein the protrusion is a first protrusion, and the cap includes a second protrusion located on an opposite side of the cap from the first protrusion.

18. The receiver drier assembly of claim 13, wherein the cap is a single-piece cap.

19. The receiver drier assembly of claim 13, wherein the cap includes a filter oriented parallel to and offset from the axis, and oriented transverse to a direction of flow through an outlet in the modulator.

* * * * *